United States Patent Office 3,580,876
Patented May 25, 1971

3,580,876
FILM-FORMING COMPOSITION OF INTER-POLYMER LATEX AND COALESCING AGENT
Raymond A. Stone, Fairfield Farms, and Fred Lister and David S. Heller, Dover, Del., assignors to Standard Brands Chemical Industries, Inc., Dover, Del.
No Drawing. Filed Apr. 19, 1968, Ser. No. 722,536
Int. Cl. C08f 19/08, 45/24, 45/34, 45/38, 45/42;
C08g 37/26, 51/24, 51/34, 51/38, 51/42
U.S. Cl. 260—29.4
15 Claims

ABSTRACT OF THE DISCLOSURE

An improved polymeric film-forming composition comprising (1) a latex of an interpolymer of an aliphatic conjugated diene, a monovinyl aromatic compound or mixtures thereof with other monovinyl compounds and an N-alkylol acrylamide and (2) a minor amount of a volatile organic azeotrope-forming coalescing agent and materials coated therewith.

---

This invention relates to aqueous interpolymer dispersions which are suitable for coatings and film-forming purposes on various substrates. In particular, the invention relates to such aqueous interpolymer dispersions which are especially adapted to form strong, water-impermeable films which films can be cured without the use of conventional cross-linking agents by the simple application of heat thereto.

Petroleum derived waxes have been used for many years to coat paper and carton boards especially for use in wrapping and containing aqueous and fatty foods such as beverage and dairy products. Such waxes tend, however, to crack and peel off the coated article. Even those modified with polyethylene, while having some improved properties, exhibit disadvantages relative to brittleness and lack of tensile strength, particularly under low temperature conditions. For this reason, wax-coated paper containers have in many instances been replaced by plastic materials such as polyethylene and polystyrene.

Despite the availability of suitable alternatives from a technical standpoint, the alternatives are frequently less economical because of the higher cost of the coating material or its means of fabrication. In particular, the coating of paper with hot melt materials such as wax, polymer-wax blends, thermoplastic polymers and the like requires the use of quite expensive, complicated equipment, the capital investment, operation and maintenance of which excessively add to the cost of the article being fabricated.

The use of synthetic rubber latices in such applications is advantageous in that they may be applied to suitable substrates at ambient-to-moderately elevated temperatures without the use of such expensive equipment. For example, the articles to be coated may be coated, sprayed or, in some instances, applied by centrifugal means.

However, the advantages and simplicity of latex coatings have not always been realizable because of other shortcomings in the character of the thusly applied latex coating. Firstly, it has been difficult to obtain uniform films of good appearance which are impervious to the contained material—e.g. aqueous and/or fatty foods such as hot coffee, ice cream, potato chips, cheese and bakery goods. Secondly, even such coatings which have possessed satisfactory appearance and imperviousness have had poor resistance to blocking. By blocking is meant the undesired adhesion between touching layers of a material, here the latex coating, such as occurs under moderate pressure during storage or use.

The composition of the invention, however, has been found to provide such films which are suitably impervious, highly flexible and tough, which are not subject to deterioration in the presence of water or fats and which have high resistance to blocking and staining.

A particularly suitable coating having outstanding properties for the formation of impervious films on various substrates is provided by the composition of the invention which is a mixture of (A) a latex of an interpolymer containing pendant N-alkylolamide groups prepared by the emulsion polymerization of (1) a $C_{4-6}$ aliphatic conjugated diene, (2) a resinous monomer comprising styrene or mixtures of styrene with other monovinyl monomers (3) an $N-C_{1-4}$ alkylol acrylamide or acrylamide precusor thereof preferably (4) a copolymerizable poly(ethylenically unsaturated) monomer which will increase the gel content of the polymer and (B) a volatile organic film coalescing agent.

THE LATEX

The latex component of the composition is a latex of an interpolymer containing pendant $N-C_{1-4}$ alkylol amide groups, prepared by emulsion polymerization of (1) 10–29% by wt. of $C_{4-6}$ conjugated diene, (2) 89–60% by wt. of resinous monomers, (3) 1–10% by wt. of an $N-C_{1-4}$ alkylol acrylamide or precursor thereof and in its preferred aspect (4) 0.8–5% by wt. of a copolymerizable poly(ethylenically unsaturated) monomer which will increase the gel content of the polymer.

Suitable $C_{4-6}$ conjugated dienes include butadiene, isoprene and chloroprene, of which butadiene is the most preferred because of its greater reactivity, as well as its being the most economical.

The basic film-forming character of the interpolymer is determined in large part by the relative proportions of conjugated diene, preferably butadiene, and the monovinyl or resinous monomer. At least about 10% by wt. butadiene is therefore required to obtain adequate film-forming properties; however, greater than about 39% by wt. butadiene is to be avoided lest the interpolymer be too tacky. From about 15 to about 25% by wt. diene is preferred. Conversely, the amount of resinous monomer must be at least about 60% by weight in order that the tackiness or blocking tendency of the polymer not be too great, but not more than about 89% to avoid poor film formation.

Suitable resinous monomers include those copolymerizable monovinyl compounds the copolymers of which are soluble in the volatile organic coalescing agent discussed hereinbelow. Preferred are the monovinyl aromatic compounds such as styrene, vinyl toluene, α-methyl styrene and the mono chlorinated styrenes. The monovinyl aromatic monomers can, however, be used in conjunction with up to about 40% by wt. of other monovinyl monomers such as $C_{1-3}$ alkyl acrylates and methacrylates, and vinylidene chloride. Acrylonitrile can also be used as a comonomer to replace part of the vinyl aromatic compound, the resultant polymers from which have outstanding stain resistance. However, it is preferred to employ no more than about 30% by wt. acrylonitrile, basis total monomer charge, in order to avoid unsatisfactory color. The replacement of part of the vinyl aromatic monomers with from about 15 to about 30% by wt. of such secondary monovinyl compounds is preferred.

The pendant $N-C_{1-4}$ alkylol amide groups in the multipolymer are provided directly by the interpolymerization of an acrylamide such as $N-C_{1-4}$ alkylol acrylamide or $N-C_{1-4}$ alkylol methacrylamide. Alternatively the pendant $N-C_{1-4}$ alkylol moiety of the multipolymer can be provided by interpolymerization therewith of a precursor such as acrylamide or methacrylamide, followed by reaction of the resultant pendant amide groups with a source of aliphatic aldehyde. To illustrate, the interpolymerization can be carried out using N-methylolacrylamide directly as a comonomer in the polymerization mixture or it can be carried out by adding acrylamide, formaldehyde and suitable catalyst, such as morpholine, to the reaction mixture to effect the in situ reaction of the acrylamide and formaldehyde to form N-methylolacrylamide. In addition, instead of using in situ preparation of the N-methylolacrylamide, the polymerization can be conducted using acrylamide monomer followed by post-polymerization reaction of the resultant pendant amide groups with formaldehyde or a source of formaldehyde such as paraformaldehyde to form N-methylol amide groups.

While the pendant N-alkylol amide moiety may contain from 1 through 4 carbon atoms, 1 and 2 carbon atoms are preferred to avoid adverse steric effects and 1 carbon atom is particularly preferred. Thus, N-methylolacylamide or its precursor acrylamide are the preferred monomers to provide the N-alkylol amide moiety of the interpolymer.

The principal function of the alkylol amide moiety of the interpolymer is, of course, to provide a basic self-crosslinking character to the interpolymer whereby the polymer can be selfcured, i.e. cured by mere aging or by the application of heat alone without the use of added catalysts or curing agents. Nevertheless, the alkylol amide moiety provides not only self-crosslinking capability but is unique in that it also provides chemical bonding (cross-linking) to cellulosic substrates such as paper and cotton.

When exceptionally high resistance to blocking is desired, e.g. at 180ö F., it is preferred to incorporate into the interpolymerization mixture a second crosslinking monomer, which will increase the gel content of the interpolymer. Suitable monomers to increase the gel content of the interpolymer and thus to improve the resistance of the polymer to blocking include, e.g. non-conjugated di-ethylenically-unsaturated compounds, such as divinyl-benzene, diallyl maleate, diallyl fumarate, diallyl phthalate, diallyl adipate, allyl acrylate, allyl methacrylate, ethylene glycol dimethylacrylate and other esters of acrylic or methacrylic acid with polyhydric alcohols, etc., as well as other polyfunctional unsaturated compounds conventionally employed as cross-linking agents. Particularly suitable secondary cross-linking (gel-forming) monomers are divinylbenzene, trimethylol propane trimethacrylate, 2-hydroxymethyl-5-norbornene acrylate and ethylene glycol dimethacrylate. Each of the preferred cross-linking monomers is characterized by the fact that it provides at least two ethylenically-unsaturated carbon-to-carbon bonds, one of which enters into the polymer chain, the other(s) of which serve(s) to crosslink the chain and thus to increase the gel content of the polymer.

Within the context of the above-referred preferred monomers, it will be noted that the divinylbenzene, 2-hydroxymethyl-5-norbornene acrylate and ethylene glycol dimethacrylate each provide two ethylenically-unsaturated carbon-to-carbon double bonds, while the trimethylol propane trimethacrylate provides three such groups.

Other suitable crosslinking monomers include the following:

1,4 butane diol diacrylate
1,4 butane diol dimethacrylate
1,3 butylene glycol diacrylate
1,10 decamethylene glycol dimethacrylate
Diallyl itaconate
Diethylene glycol diacrylate
Diethylene glycol dimethacrylate
Glyceryl trimethacrylate
1,6 hexane diol diacrylate
1,6 hexane diol dimethacrylate
2,2 dimethyl propane diacrylate
2,2 dimethyl propane dimethacrylate
Neopentyl glycol diacrylate
Neopentyl glycol dimethacrylate
Polyethylene glycol (200) diacrylate
Tetraethylene glycol diacrylate
Triethylene glycol diacrylate
2,2,4 trimethyl-1,3-pentane diol dimethacrylate
Trimethylol ethane trimethacrylate
Trimethylol propane triacrylate
Tripropylene glycol dimethacrylate The function of the cross-linking agent in the interpolymer is to add further blocking resistance to the films made therefrom in applications where that property is required. Therefore, in some instances none is required. However, where superior resistance to blocking is required, from 0.8 to about 5% by wt. of cross-linking monomer may become necessary depending upon the degree of blocking resistance needed for the films prepared thereform. From about 1 to about 3% by wt. of cross-linking monomer, basis total interpolymer, is preferred to effect adequate block resistance without adversely affecting the film-forming ability of the interpolymer latex. Though the cross-linking monomer is desirably added to the interpolymer to effect higher molecular weight by both intermolecular and, to a small extent, intramolecular cross-linking of the multipolymer, the smallest effective amount is to be used in order to avoid any adverse effect on the stability of the latex.

It has been found that blocking resistance of the interpolymer can be still further enhanced by aging of the polymerization mixture for a substantial period following completion of polymerization and prior to application to a substrate. By this means the amount of the above-described cross-linking monomer can be minimized. Conversely, the degree of resistance to blocking for a given composition can be maximized by this means. The aging is carried out by maintaining the latex polymerization mixture at a temperature of from about 110 to about 170° F. (preferably 120–150° F.) for a period of at least about 2 hours and preferably at least about 4 hours. The latex preferably should not, however, be held at this temperature longer than about 12 hours lest the stability of the latex be adversely affected.

THE FILM COALESCING AGENT

When the composition of the invention is used to coat substrates such as paper, it is, of course, desirable that the film coating be as uniform as possible (1) to achieve maximum imperviousness and (2) to obtain uniform surface physical characteristics, particularly optical properties, such as gloss, whiteness, transparency and smoothness.

This is achieved in the invention by incorporating into the interpolymer latex a volatile organic coalescing agent, which by physical interaction with the interpolymer increases the uniformity and smoothness of the deposited film.

To form a smooth continuous film of the interpolymer latex, which is normally not a film-forming material, it has been found that the coalescing agent should have certain important properties. Firstly, the coalescing agent must be a solvent for the interpolymer. Secondly, in order that the coalescing agent can be removed by volatilization during curing of the film it must form a lower boiling azeotropic composition containing at least about 65% wt. water and not more than 35% wt. coalescing agent. By this means the coalescing agent can be removed from the interpolymer film by volatilization at curing temperatures which are well below the temperatures at which thermal degradation of the film would take place. Thirdly, it has been found that smooth, un-wrinkled films are obtainable only when the coalescing agent is substantially insoluble in water at room temperature (20° C.). It is preferred that the coalescing agent be not more than about 50% wt. soluble and still further preferred that insolubility at 20° C. not exceed about 30% by wt. Fourthly, the coalescing agent must be chemically inert toward the interpolymer and fifthly, it is preferred to be relatively non-volatile at room temperature.

Materials which have been found to be particularly suitable for this purpose are normally liquid esters and ethers. These include glycol-ether acetates such as ethylene glycol monobutyl ether acetate and diethylene glycol monobutyl ether acetate, glycol acetates such as ethylene glycol diacetate and esters such as 2-ethyl hexyl acetate. Each of these materials fully meets the above-mentioned criteria.

The amount of coalescing agent relative to the interpolymer can vary rather widely from as little as 5 phr. to as much as 20 phr. by weight. It is ordinarily preferred to employ from about 6 to about 15 phr. which range assures an adequate degree of film continuity without excessive use of the ester, which must be volatilized from the film during the curing step. Ordinarily the amount of coalescing agent can be reduced at lower levels of resinous monomer contained in the interpolymer. Conversely, greater amounts will be preferred at the higher ranges of incorporated resinous comonomer.

Because of its inertness toward the interpolymer latex, the coalescing agent can be added to the interpolymer latex any time before actual forming of a film. Thus it may be incorporated in the polymerization system prior to, during or after polymerization. However, it is preferably added following stripping of the latex to (increase solids content) and following the aging step, especially if elevated temperatures are used, in order to avoid loss of coalescing agent by volatilization. In ordinary commercial practice the coalescing agent will be added to the interpolymer latex dispersion after aging and just prior to its being transferred to shipping containers.

The invention can best be understood and its unexpected advantages observed by reference to the following examples:

EXAMPLE I

Latices for use in the composition of the invention can be prepared by conventional emulsion polymerization methods of which the following described procedure is exemplary:

A latex having the composition, basis weight of charged monomers, 20.5% butadiene, 75% styrene, 3.5% N-methylolacrylamide and 1.0% trimethylol propane trimethacrylate, was prepared by adding to a stirred reactor 130 parts water and the water-soluble components of the reaction mixture comprising 0.15 part morpholine, 2.45 parts acrylamide, 1.1 parts formaldehyde, 2.85 parts emulsifier and wetting agent, 0.03 part sequestering agent and 0.3 part polyelectrolyte. Subsequently, 75 parts of styrene containing 0.025 part of polymerization modifier and 1.0 part of trimethylol propane trimethacrylate are charged. The initial reactor charge was then completed by the addition of 20.5 parts of butadiene. The reaction mixture was heated to about 130° F. and 0.04 part of potassium persulfate catalyst injected to initiate polymerization. As polymerization proceeded, small amounts of additional catalyst were added at conversion levels of 45–55% and 85–90% respectively to speed up the polymerization reaction. Polymerization, reaching a monomer conversion level of about 94%, was essentially completed after about 11 hours. The reaction mixture was held at the reaction temperature (130–150° F.) for a period of about 4 hours, after which the polymer emulsion was stabilized by the addition of ammonium hydroxide and then stripped to increase the polymer solids content of the latex.

EXAMPLE II

A series of latices was prepared in accordance with the overall procedure of Example I in which various concentrations of seven different cross linking monomers were incorporated into the polymers and the resultant latices tested to determine their suitability as cup coatings.

To each of the interpolymer latices was added 0.12 part by weight diammonium phosphate and 5 parts by weight diethylene glycol monobutyl ether acetate coalescing agent. Each interpolymer latex was then tested as to its resistance to staining and blocking when used as a cup coating by the following procedures:

STAIN TEST

The latex containing coalescing agent is adjusted to a viscosity of 20–25 cps. by adding water and a small amount (6–10 cc.) is placed in the bottom of a formed paper cup. The cups containing the latex are held for four seconds and then the cups are rotated at a predetermined high rotational speed for four seconds to coat the interior of the cup. The thusly coated cup is heated in an oven for 2 minutes at 300° F. and cooled to room temperature. The cool coated cup is filled with a standard stain solution consisting of 100 parts by volume of water, 2 parts by volume of wetting agent (octylphenoxy polyethoxy ethanol) and a small amount of water-soluble colored dye. After the stain solution has been in the cup for 30 seconds, the cup is drained, washed with cold water and then observed for staining.

BLOCKING TEST

Five paper cups are coated by the same procedure as outlined above in the Stain Test procedure. The coated cups are nested mouth down over two uncoated cups and ten uncoated cups are nested over the nested coated cups. A weight of 681 grams is placed on top of the nest of 17 cups and the assembly is placed in a humid oven for 2 hours at 180° F. The assembly is removed from the oven and allowed to cool for one hour at room temperature. The cups are then manually separated to determine their resistance to blocking. Blocking is rated on the following basis: Blocking (B), Slight blocking (SB) and no blocking (N).

The results of these tests are given in Table I below:

TABLE I.—EFFECT OF CROSSLINKING MONOMER CONCENTRATION AND TYPE ON STAIN AND BLOCKING RESISTANCE

| Polymer composition:[1] | | | | | | | | | | | | |
|---|---|---|---|---|---|---|---|---|---|---|---|---|
| Butadiene | 20.5 | 20.5 | 20.5 | 22.0 | 22.0 | 22.0 | 22.0 | 20.5 | 20.5 | 20.5 | 20.5 | 20.5 |
| Styrene | 75.8 | 75.6 | 75.2 | 72.8 | 72.6 | 72.2 | 72.0 | 75.0 | 75.0 | 75.0 | 75.0 | 75.0 |
| N-methylolacrylamide | 3.5 | 3.5 | 3.5 | 5.0 | 5.0 | 5.0 | 5.0 | 3.5 | 3.5 | 3.5 | 3.5 | 3.5 |
| Trimethylol propane trimethacrylate | 0.2 | 0.4 | 0.8 | | | | | | | | | |
| Ethylene glycol dimethacrylate | | | | | | | | 1.0 | | | | |
| Divinyl benzene | | | | 0.2 | 0.4 | 0.8 | 1.0 | | | | | |
| Pentaerythritol tetraacrylate | | | | | | | | | 1.0 | | | |
| Trimethylol propane triacrylate | | | | | | | | | | 1.0 | | |
| 2-hydroxymethyl-5-norbornene acrylate | | | | | | | | | | | | 1.0 |
| Stain test | | | | (2) | | (3) | (2) | (2) | (2) | (2) | (2) | (2) |
| Blocking test | B | B | N | B | B | SB | N | N | N | N | N | N |

[1] Basis parts by weight charged monomer.  [2] Good.  [3] Poor.

The foregoing data indicate that resistance of the interpolymer coatings to blocking is improved by the incorporation of as litle as 0.8 part crosslinking monomer in some instances and by the incorporation of about 1.0 part uniformly. Thus, when it is desired to increase the blocking resistance of the polymer, the addition to the interpolymer of at least 0.8 part by weight crosslinking monomer is effective, on the order of 1.0 part being preferred.

EXAMPLE III

A further series of latics was prepared in the same manner as Example I in which the resinous comonomer was comprised of mixtures of two monomers. To each of the latices were added 0.12 part by weight diammonium phosphate and 7 parts by weight ethylene glycol monobutyl ether acetate as coalescing agent. Each interpolymer was tested as to its resistance to staining and blocking by the same procedures outlined in Example II above. The results of these tests are given in Table II below:

TABLE II.—EFFECT OF USING MIXTURES OF RESINOUS COMONOMERS ON STAIN AND BLOCKING RESISTANCE

| Polymer composition:[1] | | | | |
|---|---|---|---|---|
| Butadiene | 20.5 | 20.5 | 20.5 | 20.5 |
| Styrene | 75 | 50 | 50 | 50 |
| Acrylonitrile | | 25 | | |
| Methylmethacrylate | | | 25 | |
| Vinylidene chloride | | | | 25 |
| N-methylolacrylamide | 3.5 | 3.5 | 3.5 | 3.5 |
| Trimethylol propane trimethacrylate | 1.0 | 1.0 | 1.0 | 1.0 |
| Stain test | (2) | (3) | (4) | (4) |
| Blocking test | N | N | SB | SB |

[1] Basis parts by weight charged monomer.
[2] Good.
[3] Fair.
[4] Excellent to good.

The foregoing data indicate that interpolymers prepared from mixtures of acrylonitrile with stryene are fully as effective as styrene alone as to both stain and blocking resistance. While the polymers containing mixtures of methylmethacrylate and vinylidene chloride, respectively, with styrene did not yield quite as good blocking resistance, they, nevertheless, gave even better resistance to staining than styrene alone when used to coat paper beverage cups. Thus, up to about 30% by weight of the interpolymer can be comprised of vinyl comonomers other than styrene.

In the foregoing examples, each of the latices contained a small amount of cross linking monomer to supplement the cross linking action of the N-methylolacrylamide monomer and was prepared in accordance with the procedure of Example I. It will, of course, be noted that each was "aged" by holding the polymerization mixture at reaction temperature (130–150° F.) for a period of 4 hours. As will be seen by the following example, this procedure brings about improved blocking resistance to those polymers containing crosslinking monomer but is unnecessary for those which contain no supplementary crosslinking monomer.

EXAMPLE IV

Two series of latices were prepared, one of which contained supplementary crosslinking monomer the other of which contained only the basis crosslinking monomer. Each was prepared in accordance with the method of Example I except that the aging or holding time following completion of polymerization was varied incrementally from zero to about 10 hours. Separate samples of each latex were then mixed 7 parts of ethylene glycol monobutyl ether acetate and diethylene glycol monobuytl ether acetate and tested with regard to resistance to blocking. The results of these series of tests are given in Table III following:

TABLE III.—EFFECT OF AGING OF INTERPOLYMER LATEX ON RESISTANCE TO BLOCKING

| Polymer composition:[1] | | | | | | | | | | | | | | | | | | | | |
|---|---|---|---|---|---|---|---|---|---|---|---|---|---|---|---|---|---|---|---|---|
| Butadiene | 20.5 | 20.5 | 20.5 | 20.5 | 20.5 | 20.5 | 20.5 | 20.5 | 20.5 | 20.5 | 20.5 | 20.5 | 20.5 | 20.5 | 20.5 | 20.5 | 20.5 | 20.5 | 20.5 | 20.5 |
| Styrene | 75 | 75 | 75 | 75 | 75 | 75 | 75 | 75 | 75 | 76 | 75 | 76 | 76 | 76 | 76 | 76 | 76 | 76 | 76 | 76 |
| N-methylolacrylamide | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| Trimethylol propane trimethacrylate | 1 | 1 | 1 | 1 | 1 | 1 | 1 | 1 | 1 | 1 | | | | | | | | | | |
| Coalescing agent: | | | | | | | | | | | | | | | | | | | | |
| Ethylene glycol monobutyl ether acetate | 17 | 17 | 17 | 17 | 17 | | | | | | 7 | 7 | 7 | 7 | 7 | | | | | |
| Diethylene glycol monobutyl ether acetate | | | | | | 7 | 7 | 7 | 7 | 7 | | | | | | 7 | 7 | 7 | 7 | 7 |
| Aging time (hours) | 0 | 2 | 4 | 6 | 10 | 2 | 4 | 6 | 10 | 0 | 2 | 4 | 6 | 10 | 0 | 2 | 4 | 6 | 10 |
| Blocking | SB | SB | N | N | N | SB | SB | N | N | N | SB | SB | SB | SB | SB | SB | SB | SB | SB | SB |

[1] Basis parts by weight charged monomer.

The foregoing data clearly show that, in the case of the interpolymer containing a secondary crosslinking monomer, resistance to blocking was improved by aging the latex at an elevated temperature for a period of 4 hours. Moreover, this benefit is found independently of the coalescing agent which is used. On the other hand, aging of the interpolymer containing only the primary crosslinking monomer, N-methylolacrylamide, did not produce any difference in blocking resistance.

The results of the above tests also show that prolonged aging of those polymers in which a benefit as regards resistance to blocking is obtained produces no additional benefit. Furthermore, excessive aging of the latex—such as for 12 to 24 hours—may result in destabilization of the latex, that is partial or complete coagulation may take place.

Though the above-described aging phenomenon is not fully understood, it is believed that the pendant reactive groups of the secondary crosslinking monomer coreact to form a network structure, which in turn enhances the resistance to blocking of films formed therefrom. The N-methylolamide moiety of the primary crosslinking monomers, being substantially non-reactive at the above limited aging conditions of time and temperature, does not therefore produce a similar effect. In summary, aging of the latex is preferred in those cases in which (1) the interpolymer contains a secondary crosslinking monomer and (2) still greater resistance to blocking is desired, particularly at higher temperatures.

EXAMPLE V

Using an intepolymer latex prepared, in accordance with Example I, by the emulsion polymerization of 20.5 parts butadiene, 75 parts styrene, 3.5 parts methylolacrylamide and 1.0 part of trimethylol propane trimethacrylate, a series of tests was conducted in which the effect of the physical properties of the coalesceing agent upon film properties was determined. The film-forming properties of the latex were observed by casting a film of the latex onto a glass plate, which was then heated in an oven for 2 minutes at 300° F. Upon removal of the coated glass plate, film continuity, lack of homogeneity and smoothness were observed visually. The results of these tests are shown in Table IV, which follows:

300° F. Upon withdrawal of the thusly coated glass plate, film discontinuity and lack of homogeneity is shown by TABLE IV.—EFFECT OF PHYSICAL PROPERTIES OF COALESCING AGENT UPON FILM CONTINUITY AND SMOOTHNESS

| Coalescing agent: [1] | Solubility in $H_2O$ at 20° C. | Boiling point (° C.) (1 atm.) | Azeotrope temperature (° C.) | Azeotrope composition (percent $H_2O$) | Film character |
|---|---|---|---|---|---|
| Ethylene glycol monobutyl ether acetate | 1.8 | 192 | 98.8 | 72 | C. |
| Diethylene glycol monobutyl ether acetate | 6.5 | 247 | 99.8 | 92 | C. |
| Ethylene glycol diacetate | 16.4 | 191 | 99.7 | 85 | C. |
| 2-ethyl hexyl acetate | <0.03 | 199 | 99.0 | 73.5 | C. |
| Ethylene glycol monoethyl ether acetate | 22 | 156 | 97.5 | 55.5 | D. |
| Ethylene glycol monobutyl ether | Complete | 171 | 98.8 | 79 | R. |
| Diethylene glycol monobutyl ether | Complete | 231 | No azeotrope formed | | R. |
| Toluene | [2] 0.047 | 111 | 84 | 13.5 | D. |

[1] All were tested at 7 parts coalescing agent per 100 parts of interpolymer solids.
[2] At 16° C.

NOTE.—C=smooth, continuous, clear; R=continuous but highly rippled; D=discontinuous, opaque.

The above data clearly show that only those coalescing agents, which form lower boiling azeotropic compositions with water, yield satisfactorily smooth, clear and continuous film properties. Yet, it is apparent that the azeotrope formation, which is necessary to obtain adequate removal of the coalescing agent from the formed film does not by itself assure satisfactory film formation, even though it may be a solvent for the interpolymer. For example, the toluene and the ethylene glycol monoethyl ether acetate, both of which are excellent solvents for the interpolymer and form lower boiling azeotropes with water, yielded unsatisfactory, discontinuous films. From comparison with the results from the first four coalescing agents, it is apparent that the azeotropic composition must not contain less than about 65% wt. water, or, conversely, no more than about 35% wt. coalescing agent. This surprising importance of the azeotrope composition is not fully understood, but may be due to the fact that diffusion of the coalescing agent from the film is time critical. That is, it is necessary for some coalescing agent to remain in the water phase until at least most of the water is evaporated and for long enough time to effect proper plasticization of the film surface.

However, from examination of the data for the ethylene glycol monobutyl ether, it is aparent that materials which are completely soluble in water are not preferred even though they may be (1) good polymer solvents and (2) form azeotropes within the above range. Though the cause of the above-noted rippling effect is not fully understood, it is possibly due to eddy currents which commonly occur when mixtures of water-soluble solvents and water evaporate from thin films.

EXAMPLE VI

Using interpolymer latices both with and without a secondary crosslinking comonomer, a series of tests was conducted to determine how much coalescing agent is needed to bring about homogenous film formation. In each instance, the film forming ability of the latex was determined by casting a film of the latex onto a glass plate, which was then heated in an oven for 2 minutes at 300° F. Upon withdrawal of the thusly coated glass plate, film discontinuity and lack of homogeneity is shown by opacity and crazing of the film. The results of these tests are shown in Table V below:

TABLE V.—EFFECT OF COALESCING AGENT LEVEL ON FILM HOMOGENEITY

| Polymer composition: [1] | | | | | | | | | | | | | | | |
|---|---|---|---|---|---|---|---|---|---|---|---|---|---|---|---|
| Butadiene | 20.5 | 20.5 | 20.5 | 20.5 | 20.5 | 20.5 | 20.5 | 20.5 | 20.5 | 20.5 | 20.5 | 20.5 | 20.5 | 20.5 | 20.5 |
| Styrene | 75.2 | 75.2 | 75.2 | 75.2 | 75.2 | 75.2 | 75.2 | 75.2 | 75.2 | 76 | 76 | 76 | 76 | 76 | 76 |
| N-methylolacrylamide | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| Trimethylol propane trimethacrylate | 0.8 | 0.8 | 0.8 | 0.8 | 0.8 | 0.8 | 0.8 | 0.8 | 0.8 | | | | | | |
| Coalescing agent: | | | | | | | | | | | | | | | |
| Ethylene glycol monobutyl ether acetate | [1] 3 | 5 | 7 | | | | | | | 3 | 5 | 7 | | | |
| Diethylene glycol monobutyl ether acetate | | | | 3 | 5 | 7 | | | | | | | 3 | 5 | 7 |
| Ethylene glycol diacetate | | | | | | | 5 | 7 | 11 | | | | | | |
| Film character | D | C | C | D | C | C | C | C | C | D | S | C | D | S | C |

[1] Parts by weight basis charged monomer.

NOTE.—D equals Discontinuous, opaque; S equals Continuous but some opacity; C equals Continuous, clear.

These data show that about 5 parts by weight of coalescing agent are required to obtain good film homogeneity, about 7 parts by weight being preferred to obtain a still better film. Furthermore, the use of higher amounts produced no apparent further benefit to the properties of the film. However, to avoid the necessity of volatilizing excessive amounts of coalescing agent from the film, no more than about 20 parts of coalescing agent should be used. In general, from about 6 to 15 parts of coalescing agent per 100 parts of polymer solids is therefore preferred.

It is interesting to note and indicative of the uniqueness of the interpolymers of the invention that corresponding interpolymers in which a dicarboxylic acid is substituted for the N-methylolacrylamide do not possess the stain resistance needed for the application of coatings to beverage cups. This is, of course, surprising in view of the fact that similar dicarboxylated polymers do possess an analogous self-crosslinking character. This unexpected superiority of the interpolymers of the invention is shown by the following example.

EXAMPLE VII

Two latices, one consisting of 31 parts butadiene, 67 parts styrene and 2 parts itaconic acid and the other consisting of 30 parts of butadiene, 68 parts styrene and 2 parts of N-methylolacrylamide were prepared without aging of the latex and tested as to stain resistance using 7 parts of diethylene glycol monobutyl ether acetate as coalescing agent. The cups coated with the dicarboxylated latex exhibited such severe staining that the coating was considered unsuitable for this application. However, the cups coated with the N-methylolacrylamide-containing latex had satisfactory stain resistance.

All the N-methylolacrylamide-containing interpolymers in the foregoing examples were prepared by the process described in Example I in which the N-methylolacrylamide monomer is formed by the in situ reaction of acrylamide and paraformaldehyde, the reaction being catalyzed by a small amount of morpholine. However, as is discussed hereinabove, this particular method of providing the primary crosslinking monomer is not essential. This is shown by the following example:

EXAMPLE VIII

Two latices, each containing 23 parts butadiene, 73.5 parts styrene and 3.5 parts N-methylolacrylamide were prepared. One was prepared by the same method as Example I. The other was prepared in the same manner as Example I except that already formed N-methylolacrylamide was charged to the reactor in place of the acrylamide, paraformaldehyde and morpholine. Upon testing these latices combined with 7 parts of diethylene glycol monobutyl ether acetate, each exhibited good stain resistance. Film continuity of the coated latices was also good and the latices exhibited like rheological properties.

EXAMPLE IX

A latex is prepared by the emulsion polymerization of 21 parts butadiene, 75 parts styrene, 3 parts N-methylolacrylamide and 1 part trimethylol propane trimethacrylate in accordance with the method of Example VII. Upon testing of the latex combined with 7 parts of diethylene glycol monobutyl ether acetate, the latex exhibits good stain resistance as well as resistance to blocking at 180° F. Film continuity of the coated latex is very good.

EXAMPLE X

An interpolymer latex is prepared by the emulsion polymerization of 21 parts butadiene, 75 parts styrene, 3 parts N-methylolacrylamide and 1 part trimethylol propane trimethacrylate in accordance with Example 1. To this latex is added 10 parts of 2-ethylhexyl acetate as coalescing agent. Upon application of this blend to paper cups and testing for resistance to blocking and staining, it is found that the resultant coating has excellent film continuity and appearance and is satisfactory both as to stain and blocking resistance.

In each of the foregoing examples where the latices were admixed with coalescing agent, a small amount (0.12 part) of diammonium phosphate was added as well. The purpose of this addition is to effect a greater decrease in pH than that which would be produced by the evolution of ammonia for the crosslinking reactions of the N-methylolamide groups. By this means, the crosslinking reactions of the N-methylolamide groups are accelerated. As will be evident to those skilled in the art, this is a preferred means to obtain faster crosslinking but by no means necessary to the essential operability of the invention.

EXAMPLES XI THROUGH XXI

The following listed interpolymers illustrate further the scope of emulsion polymers of the invention which are found to possess good coating properties:

(XI) 14% butadiene, 81% styrene, 5% N-methylolacrylamide
(XII) 29% butadiene, 64% styrene, 7% N-methylolacrylamide
(XIII) 22% isoprene, 73.5% styrene, 3.5% N-methylolacrylamide, 1% trimethylol propane trimethacrylate
(XIV) 20% chloroprene, 75% styrene, 5% N-methylolacrylamide
(XV) 11% butadiene, 87% styrene, 1% N-methylolacrylamide, 1% 1,10-decamethylene glycol dimethacrylate
(XVI) 20% butadiene, 30% acrylonitrile, 40% styrene, 7% N-methylolacrylamide, 3% dialkyl itaconate
(XVII) 20% butadiene, 30% methylmethacrylate, 45% styrene, 3% N-methylolacrylamide, 2% triethylene glycol trimethacrylate
(XVIII) 22% butadiene, 70% styrene, 5% N-methylol methacrylamide 3% allyl acrylate
(XIX) 15% butadiene, 75% styrene, 10% N-methylolacrylamide
(XX) 20% butadiene, 75% styrene, 4% N-methylolacrylamide, 1% 1,6-hexane diol dimethacrylate
(XXI) 22% butadiene, 15% acrylonitrile, 59% styrene, 3% N-methylolacrylamide, 1% trimethylol propane trimethacrylate

What is claimed is:

1. A film-forming, self-crosslinking, coating composition consisting essentially of (A) a latex of an interpolymer containing pendant $N-C_{1-4}$ alkylol amide groups prepared by the emulsion polymerization, in an aqueous system, of a mixture of monomers consisting essentially of (1) about 10 to 39% by weight of a $C_{4-6}$ aliphatic conjugated diene, (2) about 60 to 89% by weight of a copolymerizable resinous monovinyl compound selected from the group consisting of (a) a monovinyl aromatic compound selected from the group consisting of styrene, vinyl toluene, alpha-methyl styrene and monochlorinated styrenes, (b) mixtures of the monovinyl aromatic compound with up to about 40% by weight of a monomer selected from the group consisting of $C_{1-3}$ alkyl acrylates, $C_{1-3}$ alkyl methacrylates and vinylidene chloride, and (c) mixtures of the monovinyl aromatic compound with up to about 30% by weight of acrylonitrile and (3) about 1 to 10% by weight of an $N-C_{1-4}$ alkylol acrylamide and (B) from about 5 to about 20 parts by weight per 100 parts by weight of the interpolymer solids in said latex of a volatile organic film coalescing agent which is selected from the group consisting of ethylene glycol monobutyl ether acetate, diethylene glycol monobutyl ether acetate, ethylene glycol diacetate and 2-ethyl hexyl acetate, which is a solvent for the interpolymer, which is less than about 50% by weight soluble in water at 20° C., and which forms a low boiling azeotrope with water in said latex; said azeotrope containing at least about 65% by weight of water, whereby said coalescing agent can be removed by volatilization from the interpolymer film formed from the composition during curing at temperatures below the degradation temperature of said film.

2. The film-forming coating composition of claim 1 in which the mixture of monomers also comprises 0.8–5% by wt. of copolymerizable di- to tri-ethylenically unsaturated crosslinking monomer which will increase the gel content of the interpolymer.

3. The film-forming coating composition of claim 1 in which the aliphatic conjugated diene is butadiene.

4. The film-forming coating composition of claim 1 in which the copolymerizable monovinyl compound is styrene.

5. The film-forming coating composition of claim 1 in which the $N-C_{1-4}$ alkylol acrylamide is N-methylolacrylamide.

6. The film-forming coating composition of claim 1 in which the normally liquid volatile organic film coalescing agent is ethylene glycol monobutyl ether acetate.

7. The film-forming coating composition of claim 1 in which the normally liquid volatile organic film coalescing agent is diethylene glycol monobutyl ether acetate.

8. The film-forming coating composition of claim 1 in which the normally liquid volatile organic film coalescing agent is ethylene glycol diacetate.

9. The film-forming coating composition of claim 1 in which the normally liquid volatile organic film coalescing agent is 2-ethylhexyl acetate.

10. The composition of claim 1 in which the $N-C_{1-4}$ alkylol acrylamide in said mixture of monomers is replaced with an acrylamide precursor thereof selected from the group consisting of acrylamide and methacrylamide which is reacted in situ with a source of formaldehyde in the presence of morpholine during the emulsion polymerization to form the $N-C_{1-4}$ alkylol amide groups within said interpolymer.

11. The composition of claim 10 in which the acrylamide precursor is acrylamide.

12. A film-forming coating composition comprising (A) a latex of an interpolymer prepared by the emulsion polymerization of a mixture of monomers comprising (1) about 10 to 39% by weight of butadiene, (2) about 60 to 89% by weight of copolymerizable monovinyl compound selected from the group consisting of (a) styrene, (b) mixtures of styrene with up to about 40% by weight of a monomer selected from the group consisting of $C_{1-3}$ alkyl acrylates, $C_{1-3}$ alkyl methacrylates and vinylidene chloride and (c) mixtures of styrene with up to about 30% by weight of acrylonitrile, (3) 1 to 10% by weight of N-methylol acrylamide and (4) 0.8 to 5% by weight of a copolymerizable ethylenically unsaturated crosslinking compound selected from the group consisting of a divinylbenzene, trimethylol propane trimethacrylate, 2-hydroxymethyl - 5 - norbornene acrylate and ethylene glycol dimethacrylate, and (B) from about 5 to about 20 parts by weight per 100 parts by weight of the interpolymer solids in said latex of a volatile organic film coalescing agent which is selected from the group consisting of ethylene glycol monobutyl ether acetate, diethylene glycol monobutyl ether acetate, ethylene glycol diacetate and 2-ethyl hexyl acetate, which is a solvent for the interpolymer, which is less than about 50% by weight soluble in water at 20° C. and which forms a low boiling azeotrope with water in said latex, said azeotrope containing at least about 65% by weight of water whereby said coalescing agent can be removed from the interpolymer film during curing at temperatures below the degradation temperature of said film.

13. A substrate the surface of which is coated with the crosslinked film-forming composition of claim 1, substantially all the coalescing agent and water having been removed from the coating by volatilization therefrom.

14. A substrate having a cellulosic surface coated with and chemically bonded to a layer of the crosslinked film-forming composition of claim 1, substantially all the coalescing agent and water having been removed from the coating by volatilization therefrom.

15. The substrate of claim 14 in which the cellulosic surface is paper.

References Cited

UNITED STATES PATENTS

| | | | |
|---|---|---|---|
| 2,680,110 | 6/1954 | Loughran et al. | 260—80.7 |
| 3,451,883 | 6/1969 | Plunguian | 106—170 |
| 3,457,209 | 7/1969 | Mikofalvy | 260—29.4 |

OTHER REFERENCES

Gordon & Dolgin, "Surface Coatings and Finishes," 1954, Chemical Publishing Co., Inc., New York, pp. 187–189.

JULIUS FROME, Primary Examiner

H. MINTZ, Assistant Examiner

U.S. Cl. X.R.

260—29.7, 31.4, 33.2, 852 855, 883, 889